United States Patent [19]

Yamada et al.

[11] 4,275,420
[45] Jun. 23, 1981

[54] TELEVISION RECEIVER WITH A GHOST DETECTOR

[75] Inventors: Hisafumi Yamada; Masaharu Tokuhara; Choei Kuriki, all of Tokyo, Japan

[73] Assignee: Sony Corporation, Tokyo, Japan

[21] Appl. No.: 132,143

[22] Filed: Mar. 20, 1980

[30] Foreign Application Priority Data

Mar. 29, 1979 [JP] Japan .............................. 54-40977[U]

[51] Int. Cl.³ ............................................... H04N 5/21
[52] U.S. Cl. .................................... 358/167; 358/905
[58] Field of Search .......................... 358/36, 167, 905

[56] References Cited

U.S. PATENT DOCUMENTS 4,127,874  11/1978  Iwasawa et al. ..................... 358/167

Primary Examiner—John C. Martin

Attorney, Agent, or Firm—Hill, Van Santen, Steadman, Chiara & Simpson

[57] ABSTRACT

A television receiver is disclosed in which there are provided a television signal receiving circuit including RF and IF stages; a video detector connected to the television signal receiving circuits; an AGC circuit connected between the video detector and television signal receiving circuit for automatically controlling the gain of the latter, the AGC circuit having a predetermined time constant; and a ghost detector connected to the video detector for detecting a ghost signal during a certain period in a vertical blanking period of the video signal from the video detector. In this case, a switching device is provided for switching the AGC circuit at least during the certain period in the vertical blanking period such that the detected ghost level is not substantially influenced by the transient level change of the AGC circuit.

6 Claims, 36 Drawing Figures

TELEVISION RECEIVER WITH A GHOST DETECTOR

BACKGROUND OF THE INVENTION

1. Field of the Invention

The present invention relates generally to a television receiver with a ghost detector, and more particularly to a television receiver with a ghost canceller used to cancel a ghost signal which becomes a problem when a television signal is received.

2. Description of the Prior Art

In the art, there has been proposed such a method to cancel or remove a ghost signal at a video stage, in which the respective level of the in-phase component or quadrature component of the ghost signal is detected, this detected output is used to provide a ghost cancelling signal by imitation of the ghost signal, and then a video signal containing the ghost signal and the ghost cancelling signal are composed. Another method is also proposed, in which the transfer function of the ghost signal is imitated by a transversal filter to provide a ghost cancelling signal. It is necessary in any of the above prior art methods that a ghost component must be detected from a signal wave which is contained in the standard television signal and has no direct relation to a picture signal.

Figure 1A:
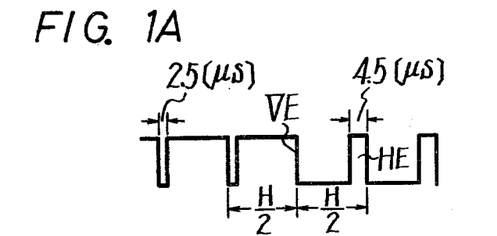
FIGS. 1A to 1C and FIGS. 2A to 2B are respectively waveform diagrams showing video signals and VIF signals used for the explanation of the present invention.
Figure 1B:
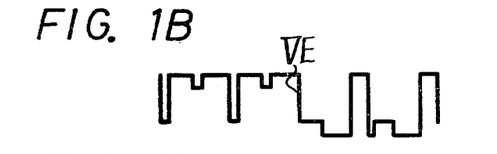
Figures 2A, 2B:
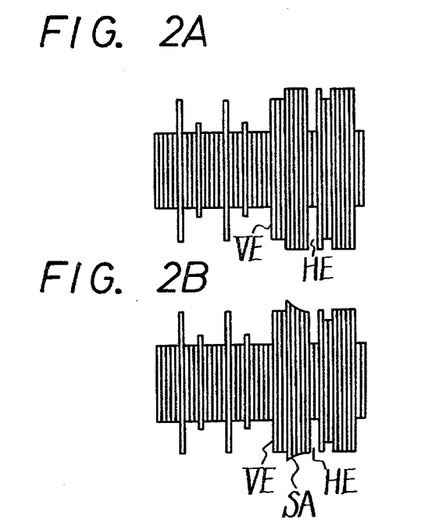

In general, as shown in FIG. 1A, the period of H/2 from a front edge VE of a vertical synchronizing signal to an equalizing pulse HE is selected as a detecting period. It is known that the waveform of the ghost signal within the detecting period becomes various dependent upon a phase difference $\psi$ between a desired signal and an undesired ghost signal at a high frequency signal stage. When it is assumed that the delay time of the undesired ghost signal from the desired signal is taken as $\tau$ and the angular frequency of the picture carrier at the high frequency signal stage is taken as $\omega_c$, such relation $\psi = \omega_c \cdot \tau$ exists. By way of example, a video intermediate frequency (VIF) signal, which contains a ghost signal with $\psi = 0°$ and delay time $\tau$ more than 4.5 $\mu$s (micro seconds), becomes as shown in FIG. 2A. When this VIF signal is supplied to a video detector, a video signal is obtained therefrom which contains a ghost signal as shown in FIG. 1B.

Figure 1C:
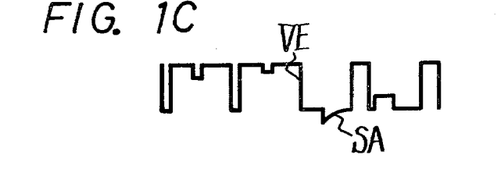

By the way, in a conventional television receiver, there is provided an automatic gain control (AGC) circuit in relation to an radio frequency (RF) amplifier and VIF amplifier of the tuner. Since the AGC circuit operates to make the top levels of the synchronizing signal constant, the VIF signal shown in FIG. 2A is subjected to the AGC operation. When the AGC circuit operates to decrease a partially projected level at the top of the synchronizing signal as shown in FIG. 2A, upon the rising-up of the AGC operation, the VIF signal becomes to have a sag portion SA as shown in FIG. 2B and hence the signal wave after the video detector contains a sag portion SA as shown in FIG. 1C. Since this sag portion SA is generated in the ghost signal detecting period, it is impossible to accurately detect the ghost signal based upon the above signal wave. It is true that if the AGC circuit is designed to have a sufficiently long time constant, the waveform shown in FIG. 1B is obtained as it is. However, it is known that, in order to improve the characteristic of the AGC, the charging time constant of the AGC is required to be selected about a time corresponding to the horizontal synchronizing pulse width (5 $\mu$s). Further, it is also known that if the discharging time constant of the AGC is selected long, the reproduced picture is deteriorated in quality by external disturbance such as a motor noise, ignition noise, fluttering noise and so on.

OBJECTS AND SUMMARY OF THE INVENTION

Accordingly, an object of the present invention is to provide a television receiver with a ghost detector which can accurately detect a ghost.

Another object of the invention is to provide a television receiver with a ghost canceller which can produce a ghost cancelling signal and hence cancel a ghost positively.

According to an aspect of the present invention, a television receiver is provided which comprises:

(A) television signal receiving means including RF and IF stages;

(B) a video detector connected to said television signal receiving means;

(C) an AGC circuit connected between said video detector and said television signal receiving means for automatically controlling the gain of the latter, said AGC circuit having a predetermined time constant;

(D) a ghost detector connected to said video detector for detecting a ghost signal during a certain period in a vertical blanking period of the video signal from said video detector; and (E) switching means for switching said AGC circuit at least during said certain period in the vertical blanking period such that the detected ghost level is not substantially influenced by the transient level change of said AGC circuit.

The other objects, features and advantages of the present invention will become apparent from the following description taken in conjunction with the accompanying drawings through which the like references designate the same elements.

DESCRIPTION OF THE PREFERRED EMBODIMENTS

The present invention will be now described with reference to the attached drawings.

Figure 3:
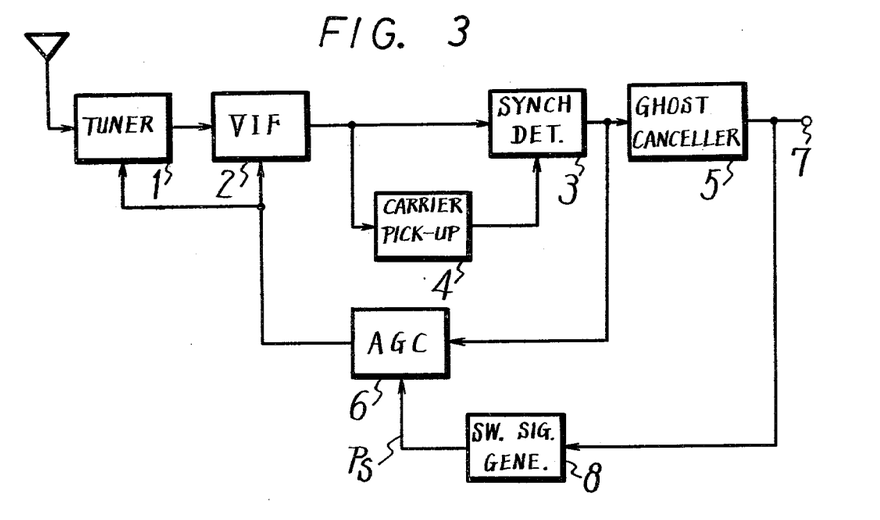
FIG. 3 is a block diagram showing the fundamental construction of an example of the invention.

FIG. 3 shows in block the fundamental construction of an example of the invention. In FIG. 3, 1 designates a tuner, 2 a VIF amplifier, 3 a synchronous detector, and 4 a carrier pick-up circuit picking up a carrier signal required in synchronous detection from the VIF signal, respectively. The video signal from the synchronous detector 3 is fed to a ghost canceller circuit 5 and also to an AGC circuit 6 which produces an AGC voltage for the RF amplifier in the tuner 1 and the VIF amplifier 2. At an output terminal 7 of the ghost canceller circuit 5, there appears a video signal from which the ghost signal is substantially cancelled. The video signal appearing at the output terminal 7 is fed to a switching signal generator 8 which produces a switching signal $P_S$. This switching signal $P_S$ is fed to the AGC circuit 6 to switch its time constant in such a manner that the time constant of the AGC circuit 6 becomes large or long during the ghost signal detecting period.

Figure 4:
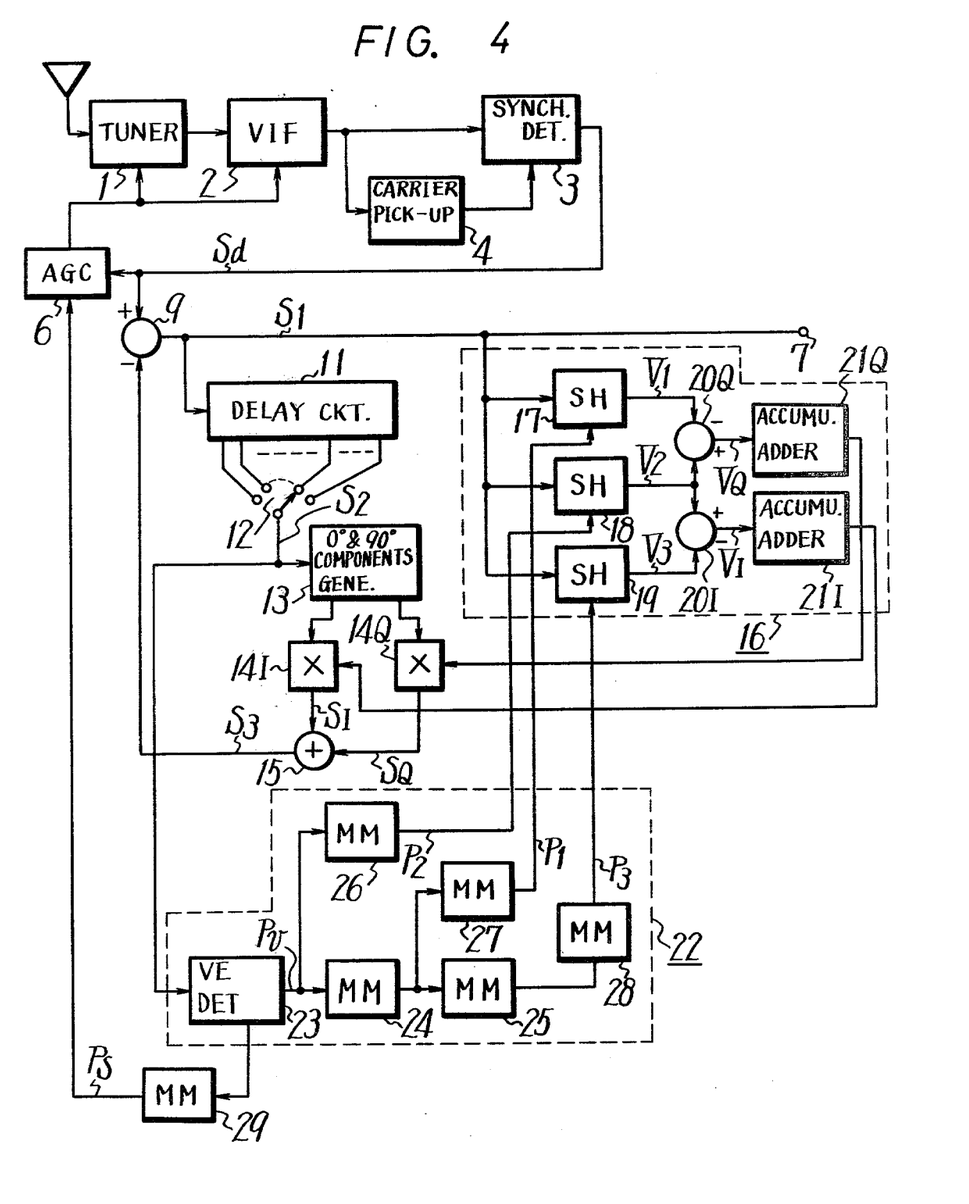
FIG. 4 is a block diagram showing in detail an example of the invention.

FIG. 4 shows in detail an example of the present invention. In this example, the ghost canceller circuit is so formed to cancel or remove a single delayed ghost with a simple construction due to the fact that a practical ghost is the single delayed ghost. That is, the in-phase component and quadrature component of the ghost signal are varied in accordance with difference of a received channel (difference of $\omega_c$). However, when the broadcasts of the respective channels are on air from a single station as in Japan, the delay time $\tau$ of a ghost signal is constant. Accordingly, the delay time $\tau$ is determined, and the levels of the in-phase and quadrature components of the ghost signal are controlled to produce a ghost cancelling signal.

Figure 5A:
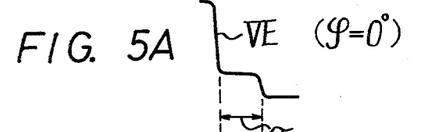
FIGS. 5A to 5H and FIG. 6 are respectively waveform diagrams used for explaining the example of the invention shown in FIG. 4.
Figure 5B:
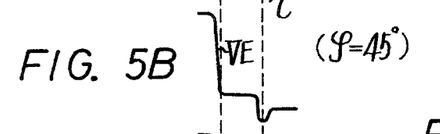
Figures 5C, 5D, 5E, 5F, 5G:
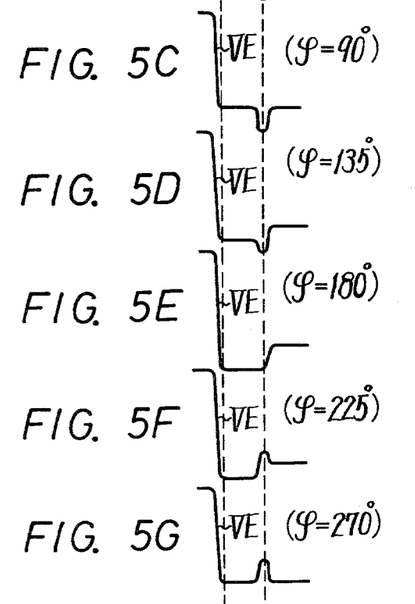
Figure 5H:
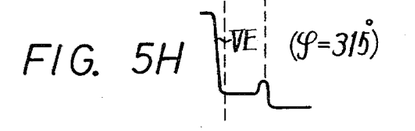

As a portion to detect the level and polarity of the in-phase and quadrature components, a portion from the front edge of the vertical synchronizing signal to a predetermined period is used. FIGS. 5A to 5H each show the waveform near the front edge VE of the vertical synchronizing signal in correspondence with the phase difference $\psi$ between a desired signal and a ghost signal at the high frequency stage, respectively. In case $\psi=0°$, as shown in FIG. 5A, the ghost of the front edge VE appears with the delay time of $\tau$ and the ghost becomes only the in-phase component coincident in polarity. In case of $\psi=180°$, as shown in FIG. 5E, only the in-phase component, in which the polarity of a ghost is inverted and the front edge VE is delayed by $\tau$, exists. Similarly, in cases of $\psi=90°$ and $\psi=270°$, as shown in FIGS. 5C and 5G, only the quadrature components exist, respectively, and similarly, in cases of $\psi=45°$, 135°, 225° and 315°, such facts as shown in FIGS. 5B, 5D, 5F and 5H, respectively are known. In consideration of the above specific property of the waveform, the levels of the video signal at least three points i.e. first position corresponding to the delay time $\tau$ of the ghost from the desired signal, and second and third positions before and after the first position by predetermined time periods are detected.

Figure 6:
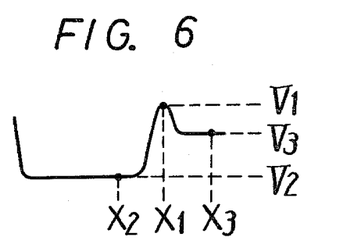

In FIG. 6, as an example, a first position X1, second position X2 and third position X3 in case of $\psi=225°$ are shown, respectively. If the detecting levels at the respective positions are taken as V1, V2 and V3, a detected signal VI obtained by the calculation V2−V3 corresponds to the level and polarity of the in-phase component of the ghost signal, and a detected signal VQ obtained by the calculation V2−V1 corresponds to the level and polarity of the quadrature component of the ghost signal since the in-phase component of the ghost signal is simultaneously cancelled.

Accordingly, if the in-phase and quadrature components are provided from an input video signal delayed by $\tau$, the weighting of the level and polarity of the in-phase and quadrature components is carried out in proportion to the above detected signals VI and VQ, and both of them are composed, a ghost cancelling signal can be provided. Then, if the ghost cancelling signal is composed with a non-delayed original video signal, the ghost signal contained therein can be cancelled.

In the example of the invention shown in FIG. 4, there is provided an adder 9 at which an original video signal Sd provided by the synchronous detection is composed with the ghost cancelling signal. An output S1 from the adder 9 is delivered to the output terminal 7. As in a conventional television receiver, though not shown, a cathode ray tube is connected to the output terminal 7 through a video amplifier and so on.

The output S1 from the adder 9 is supplied to a delay circuit 11 such as a delay line, charge transfer device or the like from which a plurality of taps are led out in such a manner that the delay time between i−1 and i taps is equal to that between i and i+1 taps. Either of the plurality of taps is selected by a switching means or device 12 and a delayed video signal S2 appeared at its selected tap is supplied to an in-phase (0°) and quadrature (90°) component generator circuit 13. The in-phase component and quadrature components from the generator circuit 13 are respectively supplied to multipliers 14I and 14Q whose outputs SI and SQ are fed to an adder 15 which produces an output or ghost cancelling signal S3.

The output S1 from the adder 9 is also supplied to an in-phase and quadrature component detector 16 for the ghost signal surrounded by a broken line. This detector 16 has provided with sample-and-hold circuits 17, 18 and 19 which are respectively supplied with the output S1 from the adder 9, an adder 20Q, which is supplied with output voltages V1 and V2 from the sample-and-hold circuits 17 and 18 and produces a detected output VQ=V2−V1, an adder 20I, which is supplied with output voltages V2 and V3 from the sample-and-hold circuits 18 and 19 and produces a detected output VI=V2−V3, and analog accumulative adders 21Q and 21I which accumulate the outputs VQ and VI from the adders 20Q and 20I, respectively. The output from the accumulative adder 21I is supplied to the multiplier 14I as a weighting coefficient, and the output from the accumulative adder 21Q is fed to the multiplier 14Q as a weighting coefficient. Thus, cancelling signals respectively corresponding to the in-phase and quadrature components of the ghost can be provided.

Sampling pulses P1, P2 and P3 necessary to the sample-and-hold circuits 17, 18 and 19 in the detector 16 are formed by a sampling pulse generator circuit 22 surrounded by a broken line in FIG. 4. This sampling pulse generator circuit 22 can produce the sampling pulse P1 at a position corresponding to the delay time $\tau$ of the ghost signal. The delayed video signal S2 appeared at the selected tap of the delay circuit 11 by the switching device 12 is fed to a detector circuit 23 in the circuit 22 for detecting the front edge VE of the vertical synchronizing signal. This detector circuit 23 produces a detected pulse Pv rising up at the front edge of the vertical synchronizing signal. Since the vertical synchronizing signal obtained from an ordinary synchronous separator circuit is generally delayed little from that contained in an input video signal, the detector circuit 23 for detecting the front edge of the vertical synchronizing signal is provided in place of the synchronous separator, by which the detected pulse Pv is produced which is coincident with the front edge of the vertical synchronizing signal in the video signal. The detected pulse Pv is fed to monostable multivibrators 24, 25, 26, 27 and 28 which then produce the sampling pulses P1, P2 and P3, respectively. The monostable multivibrators 24 and 25 serve to restrict the positions of the sampling pulses P1 and P3, and those 26, 27 and 28 serve to restrict the pulse widths of the sampling pulses P1, P2 and P3, respectively. The positions of the front edges of the respective sampling pulses correspond to the detecting positions X1, X2 and X3 in FIG. 6.

The in-phase and quadrature component generator circuit 13 is so constructed that it produces the quadrature component from the delayed video signal S2 delivered from the delay circuit 11 by a transversal filter or differentiation circuit and at the same time produces the in-phase component from the delayed video signal S2 by passing the quadrature component through a delay circuit which corrects the delay time caused by the quadrature component generator circuit. The delay time generated in the in-phase and quadrature component generator circuit 13 is taken as $\tau 2$.

As shown in FIG. 4, provided is a monostable multivibrator 29 which is triggered by the output from the detector circuit 23 for detecting the front edge of the vertical synchronizing signal and produces a switching signal $P_S$. This switching signal $P_S$ is supplied to the AGC circuit 6 which is switched to one with a long time constant during the high level period of the switching signal $P_S$.

Figure 7:
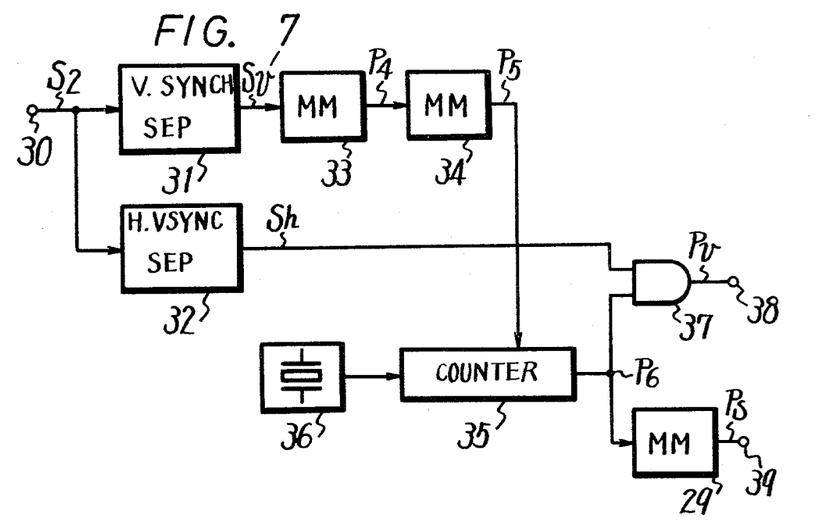
FIG. 7 is a block diagram showing an example of a detector circuit used in the example of FIG. 4 which will detect the front edge of the vertical synchronizing signal.

FIG. 7 is a block diagram showing an example of the detector circuit 23 for detecting the front edge of the vertical synchronizing signal. In FIG. 7, an input terminal 30 is supplied with the delayed video signal S2 which is in turn fed to vertical and horizontal synchronous separator circuits 31 and 32. As described above, the delayed video signal S2 appears at the output of the switching device 12. The vertical synchronous separator circuit 31 includes an integrator with a long time constant, while the horizontal synchronous separator 32 includes an integrator with a short time constant. Each of the separator circuits 31 and 32 has provided with a clamp circuit at the front stage of the integrator to be free of the influence caused by the fluctuation of an APL (average picture level). When the level of a ghost, especially a ghost in out-of-phase is high, the amplitude of a video carrier signal becomes low. Thus, in such case, it becomes difficult to detect the horizontal synchronizing signal within the vertical blanking period, and in some cases the horizontal synchronizing signal may be dropped out. If the integration time constant is set short so as to avoid the above drop-out, the vertical synchronizing signal can not be detected accurately due to the existence of the equalizing pulse. Therefore, two independent synchronous separators or vertical and horizontal synchronous separator circuits 31 and 32 are provided.

Figure 8A:
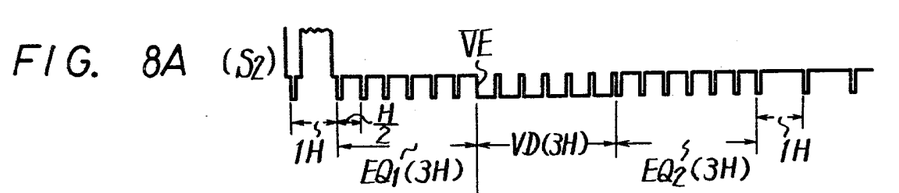
FIGS. 8A to 8H are respectively waveform diagrams used to explain the operation of the detector circuit shown in FIG. 7.
Figure 8B:
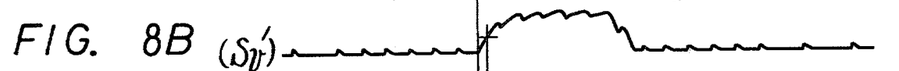
Figure 8C:
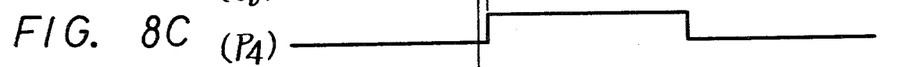

When the input terminal 30 is supplied with the delayed video signal S2 which includes an equalizing pulse period EQ1 of 3H consisting of equalizing pulses, a vertical synchronizing signal period VD of 3H following the period EQ1 and a equalizing pulse period EQ2 of 3H following the period VD as shown in FIG. 8A, an output $S_v'$ from the integrator in the vertical synchronous separator circuit 31 becomes as shown in FIG. 8B. That is, since the time constant of the integrator is large for the horizontal synchronizing signal or equalizing pulse, the level of the output $S_v'$ from the integrator does not reach a standard level but reaches the standard level in the vertical synchronizing signal period VD. Thus, the vertical synchronizing signal rising up at this timing is generated. The output $S_v'$ is fed to a monostable multivibrator 33 which is then triggered at the rising-up edge of the output or vertical synchronizing signal $S_v'$ and generates a pulse P4 shown in FIG. 8C. This pulse P4 is fed to a monostable multivibrator 34 which is triggered at the rising-up edge of pulse P4 and generates a reset pulse P5 shown in FIG. 8D. The time constant of the monostable multivibrator 33 is so selected that the pulse width of pulse P4 is little longer than the vertical synchronizing signal period VD to avoid that the monostable multivibrator 34 is triggered by a noise contained within the vertical synchronizing signal period VD.

Figures 8D, 8E:
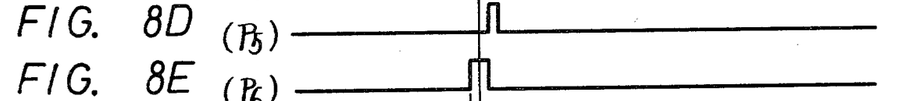

The reset pulse P5 is fed to a counter 35 which is supplied with an output from a reference oscillator 36 which has a frequency (200 KHz to 1 MHz) sufficiently higher than the horizontal frequency to count the output. As the reference oscillator 36, a quartz oscillator, for example, may be used. The counter 35 is reset at the rising-up edge of the reset pulse P5 and then produces an output pulse P6 after about (1V-1H) period where 1V is one vertical period as shown in FIG. 8E.

Figure 8F:
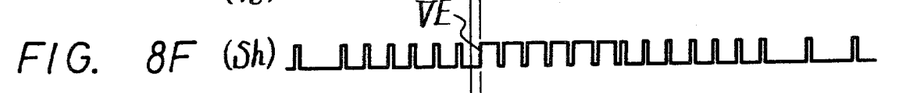

The horizontal synchronous separator circuit 32 separates and delivers a horizontal synchronizing signal Sh including the equalizing pulses as shown in FIG. 8F. This horizontal synchronizing pulse Sh and the pulse P6 from the counter 35 are supplied to an AND gate 37 which in turn produces at its output terminal 38 a detecting pulse Pv whose rising-up edge coincides with the front edge VE of the vertical synchronizing signal in the following field as shown in FIG. 8G.

Figures 8G, 8H:
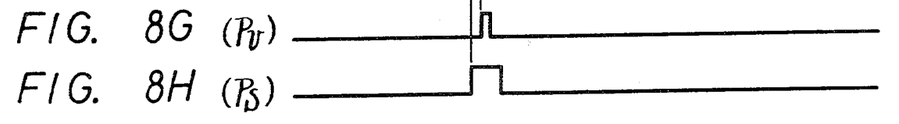

The output pulse P6 from the counter 35 is fed also to a monostable multivibrator 29 which is triggered at the front edge of pulse P6 and then produces at its output terminal 39 a switching signal $P_S$ as shown in FIG. 8H. This switching signal $P_S$ is such one that it is in high level within a period from the time before the front edge VE of the vertical synchronizing pulse by about H/2 to the following equalizing pulse or may be such a pulse whose falling-down is delayed or with a pulse width wider than that shown in FIG. 8H.

Figure 9A:
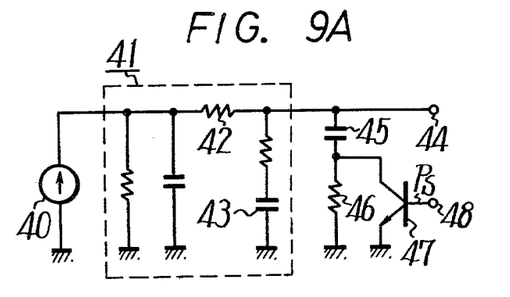
FIGS. 9A and 9B are connection diagrams each showing an AGC circuit useable in the example of FIG. 4.

FIG. 9A shows an example of the AGC circuit 6. In FIG. 9A, 40 designates a constant current source which generates a constant current with the level corresponding to the tip level of the synchronizing signal. This constant current is supplied to a loop filter shown in the figure by a broken line block 41 whose time constant is determined mainly by its resistor 42 and capacitor 43. The AGC voltage is obtained at an output terminal 44 led out from the loop filter 41. Between the output terminal 44 and the ground, inserted is a series connection of a capacitor 45 and a resistor 46 for discharging. The connection point between the capacitor 45 and resistor 46 is connected to the collector of an NPN transistor 47 whose emitter is grounded and whose base is connected to an output terminal 48 to which the above switching signal $P_S$ is applied. Thus, when the transistor 47 turns ON during the high level period of the switching signal $P_S$, the capacitor 45 is connected in parallel to the capacitor 43 to increase the time constant of the loop filter 41. During the low level period of the switching signal $P_S$, the transistor 47 turns OFF. Thus, at this time the loop filter 41 has the inherent time constant since the resistance value of the resistor 46 is high.

The part of the loop filter 41 is connected externally even when the circuit is of an integrated circuit construction, so that it is easy to additionally provide the capacitor 45, resistor 46 and transistor 47.

Figure 9B:
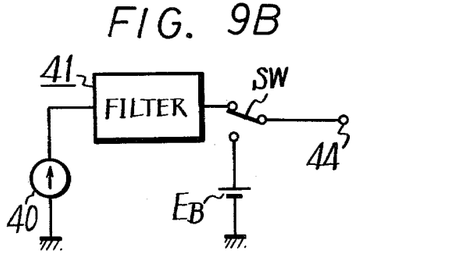

Other than switching the time constant of the AGC circuit to large one, it may be possible to make the operation of the AGC circuit ineffective. For example, as shown in FIG. 9B, such a construction may be considered that during the high level period of the switching signal $P_S$, a predetermined DC voltage $E_B$ is used through a switching means or device SW in place of the AGC voltage through the filter 41.

Figure 10A:
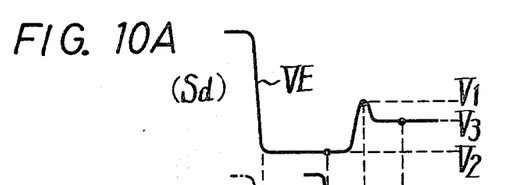
FIGS. 10A to 10G are respectively waveform diagrams used to explain the ghost signal removing or cancelling operation of the example shown in FIG. 4.
Figures 10B, 10C:
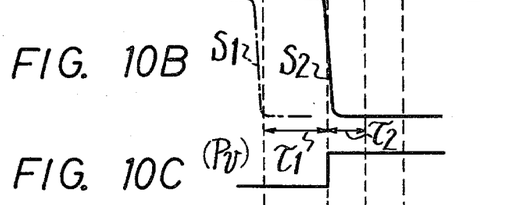
Figure 10D:
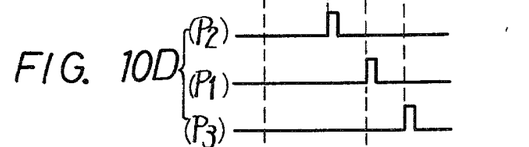

Now, a description will be given in detail on the operation when the video signal Sd containing a ghost signal as shown in FIG. 10A is supplied from the synchronous detector 3 of the example shown in FIG. 4. Firstly, a viewer operates the switching device 12 while watching a reproduced image to select one of the taps of the delay circuit 11 at which the ghost signal is least. Under this state, the video signal S1 from which the ghost signal is cancelled as shown in FIG. 10B by the one-dot chain line is delivered to the output terminal 7, and also the video signal S2 (shown in FIG. 10B by the solid line) with a delay time $\tau 1$, which is obtained by subtracting the delay time $\tau 2$ generated in the in-phase and quadrature component generator circuit 13 from the delay time $\tau$ of the ghost signal, is derived from the delay circuit 11. Accordingly, the front edge (VE) detector 23 produces the detected pulse $P_v$ which rises up at the timing coincident with the front edge VE of the vertical synchronizing signal in the video signal S2 as shown in FIG. 10C. The monostable multivibrators 24 and 26 are triggered at the rising-up edge of the detected pulse $P_v$, and the monostable multivibrator 26 produces the sampling pulse P2. Further, when the delay time of the monostable multivibrator 24 is selected equal to $\tau 2$, the sampling pulse P1 can be produced by the monostable multivibrator 27 which is triggered by the output from the monostable multivibrator 24. Further, the sampling pulse P3 can be produced at the position delayed from the sampling pulse P1. These sampling pulses P1, P2 and P3 are shown in FIG. 10D.

As described above, since the sampling pulse generator circuit 22 produces the sampling pulses P1, P2 and P3 based upon the video signal S2 appeared at the tap of the delay circuit 11 selected by the switching device 12, the sampling pulse corresponding to the delay time $\tau$ of the ghost signal can be automatically generated.

Figure 10E:
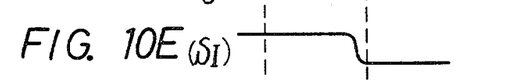
Figure 10F:
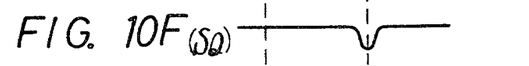
Figure 10G:
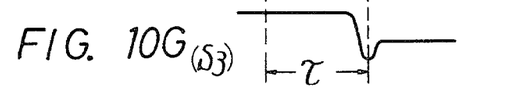

By the accumulatively added output of the detected signal $VI(=V2-V3)$, which is provided by the sampling output voltages V1, V2 and V3 from the sample-and-hold circuits 17, 18 and 19, an in-phase component SI shown in FIG. 10E is generated from the multiplier 14I, and by the accumulatively added output of the detected signal $VQ(=V2-V3)$, a quadrature component SQ shown in FIG. 10F is generated from the multiplier 14Q. As a result, the adder 15 generates the ghost cancelling signal $S3(=SI+SQ)$ shown in FIG. 10G which is fed to the adder 9 to be composed with the video signal Sd shown in FIG. 10A whereby the ghost contained in the video signal Sd is cancelled.

As will be understood from the above description on example of the invention shown in FIG. 4, according to the present invention, during the ghost detecting period, the time constant of the AGC circuit is made large or the operation of the AGC circuit is made ineffective, so that it is avoided that the waveform during the detecting period is made different to the original waveform by the rising-up response of the AGC operation as described previously. Accordingly, the level and so on of the ghost signal can be accurately detected by the invention.

Figure 11:
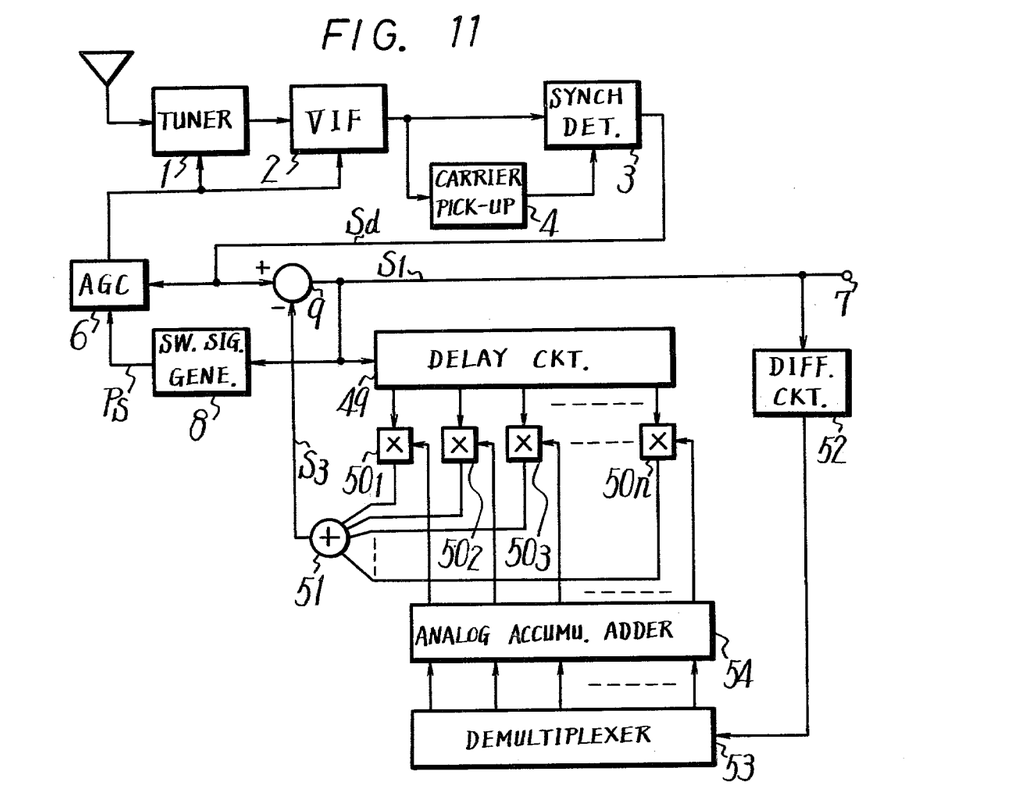
FIG. 11 is a block diagram showing another example of the invention.

FIG. 11 shows another example of the invention. In this example, as the ghost canceller circuit, a transversal filter is used to imitate the ghost signal and hence to provide a ghost cancelling signal. That is, in the example of FIG. 11, the video signal S1 appeared at the output of the adder 9 is fed to a delay circuit 49 which has provided with n's (for example, 256) taps arranged with the distance of the sampling period $\Delta \tau$ (for example, 100 ns). The outputs at the respective taps are fed to multipliers $50_1$ to $50_n$ whose outputs are fed to an adder 51 which in turn produces a ghost cancelling signal S3. The video signal S1 appeared at the output of the adder 9 is also fed to a differentiation circuit 52 whose differentiated output waveform is supplied to a demultiplexer 53. This demultiplexer 53 has n's taps arranged with the distance of the sampling period $\Delta \tau$ similar to the delay circuit 49. The outputs at the respective taps of the demultiplexer 53 are supplied to an analog accumulative adder 54, which has provided with n's analog accumulative adders of, for example, sample-and-hold circuit construction, and in which the sample-and-gates thereof are made ON in the timing when the differentiated waveform during the detecting period (after about H/2 from the front edge VE of the vertical synchronizing signal) is finished to be fed to the demultiplexer 53 and n's values obtained by sampling the differentiated waveform of the ghost signal with the sampling period $\Delta \tau$ are stored on the holding capacitors. The n's values from the holding capacitors of the analog accumulative adder 54 are respectively fed to the multipliers $50_1$ to $50_n$ as weighting coefficients. Thus, the adder 51 can produce the ghost cancelling signal S3.

The video signal S1 appeared at the output of the adder 9 of the ghost canceller circuit is fed to the switching signal generator circuit 8 which then generates a switching signal $P_S$. This switching signal $P_S$, similar to that of the first example of the invention, becomes high level little before the front edge VE of the vertical synchronizing signal whereby the time constant of the AGC circuit 6 is switched to a large one or the operation of the AGC circuit 6 is made ineffective. Accordingly, similar to the foregoing example, the ghost can be also accurately detected by the example of FIG. 11.

In the examples of the invention shown in FIGS. 4 and 11, a feedback type ghost canceller is used, but it will be apparent that a feedforward type ghost canceller may be used with the same effect.

Further, since the fact that the waveform within the detecting period becomes to have a sag by the AGC operation is remarkable in the case that the ghost components of in-phase exist, it may be possible to supply the switching signal $P_S$ to the AGC circuit 6 only in such a case. In other words, in the example of the invention shown in FIG. 4, a gate circuit is provided whose ON and OFF is controlled by whether or not the output from the accumulative adder 211 exists and the switching signal $P_S$ is supplied to the AGC circuit 6 through the gate circuit.

In addition, it is of course possible that the present invention is applied to a ghost measuring or detecting apparatus which measures or detects the level and so on of the ghost signal.

It will be apparent that many modifications and variations could be effected by one skilled in the art without departing from the spirits or scope of the novel concepts of the present invention, so that the spirits or scope of the invention should be determined by the appended claims.

We claim as our invention:

1. A television receiver comprising:
   (A) television signal receiving means including RF and IF stages;
   (B) a video detector connected to said television signal receiving means;
   (C) an AGC circuit connected between said video detector and said television signal receiving means for automatically controlling the gain of the latter, said AGC circuit having a predetermined time constant;
   (D) a ghost detector connected to said video detector for detecting a ghost signal during a certain period in a vertical blanking period of the video signal from said video detector; and
   (E) switching means for switching said AGC circuit at least during said certain period in the vertical blanking period such that the detected ghost level is not substantially influenced by the transient level change of said AGC circuit.

2. A television receiver according to claim 1; wherein said switching means switches the time constant of said AGC circuit longer during said certain period.

3. A television receiver according to claim 1; wherein said switching means defeats the operation of said AGC circuit during said certain period.

4. A television receiver comprising:
   (A) television signal receiving means including RF and IF stages;
   (B) a video detector connected to said television signal receiving means;
   (C) an AGC circuit connected between said video detector and said television signal receiving means for automatically controlling the gain of the latter; said AGC circuit having a predetermined time constant;
   (D) a ghost canceller connected to said video detector, said ghost canceller including ghost detecting means for detecting a ghost level during a certain period in a vertical blanking period of the video signal from said video detector, a ghost imitating circuit responsive to the video signal from said video detector and the detected ghost level from said ghost detecting means for producing a ghost cancelling signal, and an adder for adding said video signal from said video detector and said ghost cancelling signal; and
   (E) switching means connected between said ghost canceller and said AGC circuit for switching the latter at least during said certain period in the vertical blanking period such that the detected ghost level is not substantially influenced by the transient level change of said AGC circuit.

5. A television receiver according to claim 4; wherein said switching means switches the time constant of said AGC circuit longer during said certain period.

6. A television receiver according to claim 4; wherein said switching means defeats the operation of said AGC circuit during said certain period.

* * * * *